United States Patent
Nomura et al.

(10) Patent No.: US 9,296,559 B2
(45) Date of Patent: Mar. 29, 2016

(54) AUTOMATED WAREHOUSE RACK (71) Applicants: TOKAI RUBBER INDUSTRIES, LTD., Komaki-shi (JP); Murata Machinery, Ltd., Kyoto-shi (JP)

(72) Inventors: Takeshi Nomura, Komaki (JP); Norifumi Hamamoto, Inuyama (JP); Osamu Fukuta, Inuyama (JP)

(73) Assignees: SUMITOMO RIKO COMPANY LIMITED, Aichi (JP); MURATA MACHINERY, LTD., Kyoto-Shi (JP)

( * ) Notice: Subject to any disclaimer, the term of this patent is extended or adjusted under 35 U.S.C. 154(b) by 22 days.

(21) Appl. No.: 14/394,714

(22) PCT Filed: Apr. 9, 2013

(86) PCT No.: PCT/JP2013/060662
§ 371 (c)(1),
(2) Date: Oct. 15, 2014

(87) PCT Pub. No.: WO2013/157434
PCT Pub. Date: Oct. 24, 2013

(65) Prior Publication Data
US 2015/0068997 A1 Mar. 12, 2015

(30) Foreign Application Priority Data
Apr. 19, 2012 (JP) .................. 2012-095724

(51) Int. Cl.
A47B 43/00 (2006.01)
B65G 1/02 (2006.01)
A47B 57/40 (2006.01)

(52) U.S. Cl.
CPC .. B65G 1/02 (2013.01); A47B 57/40 (2013.01)

(58) Field of Classification Search
CPC .................. A47B 57/40; B65G 1/02
USPC ............ 211/190–193, 49.1, 13.1, 151, 103, 211/189, 207; 108/106–108
See application file for complete search history.

(56) References Cited

U.S. PATENT DOCUMENTS

| 268,748 | A | * | 12/1882 | Steward | .......... E04H 1/04 211/85.22 |
| 1,620,841 | A | * | 3/1927 | Vance | ......... A47B 96/027 211/134 |

(Continued)

FOREIGN PATENT DOCUMENTS

DE 102004018126 A1 * 10/2005 ............ A62C 35/60
JP 03195611 A 8/1991

(Continued)

OTHER PUBLICATIONS

International search report dated Jul. 16, 2013 issued in corresponding PCT application PCT/JP2013/060662.

(Continued)

Primary Examiner — Joshua J Michener
Assistant Examiner — Devin Barnett
(74) Attorney, Agent, or Firm — DLA Piper LLP (US)

(57) ABSTRACT

Shelf parts of a rack apparatus for an automated warehouse include a hollow placement member and a stopper. The placement member is fixed to a rack main body and has a placement surface onto which an article is placed. The stopper is disposed at an end part of the placement member and restricts vibration of the article in a first horizontal direction. The stopper includes a base member fixed to the placement member, a projection member having a projection extending higher than the placement surface, and a viscoelastic member connecting the base member and the projection member within the placement member. The viscoelastic member generates a damping force when the viscoelastic member is deformed by the shear in the first horizontal direction.

15 Claims, 10 Drawing Sheets

(56) References Cited

U.S. PATENT DOCUMENTS

| | | | | | |
|---|---|---|---|---|---|
| 2,727,638 | A | * | 12/1955 | Sestan | E04H 6/225 187/217 |
| 2,895,619 | A | * | 7/1959 | Frazier | A47B 57/404 211/187 |
| 2,945,596 | A | * | 7/1960 | Higgins | A47B 47/022 211/134 |
| 2,963,169 | A | * | 12/1960 | Koustant | A47B 47/022 211/134 |
| 2,968,409 | A | * | 1/1961 | Jurechko | B65G 1/14 211/134 |
| 2,971,658 | A | * | 2/1961 | Altrui | A47B 57/42 211/193 |
| RE25,117 | E | * | 1/1962 | Edwards, Jr. | A47B 47/022 108/108 |
| 3,212,648 | A | * | 10/1965 | Baker, Jr. | A47B 47/022 108/108 |
| 3,258,145 | A | * | 6/1966 | Costello | B66F 9/06 414/607 |
| 3,323,655 | A | * | 6/1967 | Foran | A47B 57/402 211/134 |
| 3,337,061 | A | * | 8/1967 | Caudell | B65G 1/02 211/134 |
| 3,371,798 | A | * | 3/1968 | Altrui | A47B 57/485 211/182 |
| 3,391,795 | A | * | 7/1968 | Finlayson | A47B 57/50 211/134 |
| 3,455,469 | A | * | 7/1969 | Evans | B65G 1/0435 211/79 |
| 3,545,626 | A | * | 12/1970 | Seiz | A47B 57/485 211/187 |
| 3,602,374 | A | * | 8/1971 | Alabaster | A47B 57/485 211/193 |
| 3,659,723 | A | * | 5/1972 | Konstant | B65G 1/02 211/134 |
| 3,664,513 | A | * | 5/1972 | Atwater | B65G 1/02 311/134 |
| 3,685,665 | A | * | 8/1972 | Atwater | B65G 1/02 211/191 |
| 3,698,566 | A | * | 10/1972 | D'Altrui | A47B 57/48 211/193 |
| 3,757,967 | A | * | 9/1973 | Colbridge | B65G 1/02 14/42 |
| 3,762,343 | A | * | 10/1973 | Thacker | B65D 19/38 108/53.3 |
| 3,785,502 | A | * | 1/1974 | Konstant | B65G 19/38 108/53.3 |
| 3,787,016 | A | * | 1/1974 | Laval, Jr. | F16L 3/23 211/193 |
| 3,802,574 | A | * | 4/1974 | Weider | A47B 47/027 108/187 |
| 3,971,476 | A | * | 7/1976 | Konstant | A47F 5/10 211/134 |
| 4,053,246 | A | * | 10/1977 | Uccello | A47B 57/54 211/182 |
| 4,117,938 | A | * | 10/1978 | Klein | A47B 57/482 211/182 |
| 4,319,689 | A | * | 3/1982 | Clapp | B65G 1/02 211/134 |
| 4,551,059 | A | * | 11/1985 | Petoia | B66C 19/005 414/459 |
| 4,687,404 | A | * | 8/1987 | Seiz | B65G 1/06 211/151 |
| 4,949,852 | A | * | 8/1990 | Allen | B65G 1/06 211/151 |
| 4,955,489 | A | * | 9/1990 | Allen | B65G 1/026 211/151 |
| 4,955,490 | A | * | 9/1990 | Schafer | A47B 96/02 211/187 |
| 4,971,507 | A | * | 11/1990 | Weggelaar | B66F 9/122 414/279 |
| 5,160,294 | A | * | 11/1992 | Petter | G08B 17/10 454/1 |
| 5,170,829 | A | * | 12/1992 | Duncan | B65G 1/02 160/194 |
| 5,181,815 | A | * | 1/1993 | Haberkorn | B60P 7/135 182/152 |
| 5,246,397 | A | * | 9/1993 | Petter | G08B 17/10 454/1 |
| 5,265,740 | A | * | 11/1993 | Hodsden | A47B 57/08 211/187 |
| 5,273,170 | A | * | 12/1993 | Azzopardi | B65G 1/02 211/189 |
| 5,279,431 | A | * | 1/1994 | Highsmith | B65G 1/02 211/187 |
| 5,312,004 | A | * | 5/1994 | Krummell | A47B 53/00 211/151 |
| 5,720,399 | A | * | 2/1998 | Kohlhaas | A47B 47/027 211/133.1 |
| 5,894,946 | A | * | 4/1999 | Darnell | A47B 57/18 211/183 |
| 5,964,361 | A | * | 10/1999 | Mefford | B65G 1/02 211/189 |
| 6,173,846 | B1 | * | 1/2001 | Anderson | A47B 47/027 211/183 |
| 6,230,903 | B1 | * | 5/2001 | Abbott | H05K 7/1421 211/190 |
| 6,260,719 | B1 | * | 7/2001 | Azzopardi | B65G 1/02 211/189 |
| 6,298,537 | B1 | * | 10/2001 | Dion | A47B 96/00 211/189 |
| 6,332,549 | B1 | * | 12/2001 | MacDonald | A47B 47/027 211/182 |
| 2001/0023854 | A1 | * | 9/2001 | Gearin | B60P 3/07 211/85.8 |
| 2003/0127407 | A1 | * | 7/2003 | Gruber | A47B 47/027 211/189 |
| 2003/0155319 | A1 | * | 8/2003 | Wishart | A47B 47/027 211/189 |
| 2004/0105655 | A1 | * | 6/2004 | Ciulla | H05K 7/18 211/26 |
| 2004/0155003 | A1 | * | 8/2004 | Anderson | A47F 5/01 211/191 |
| 2005/0109723 | A1 | * | 5/2005 | Czerwinski | A47B 47/0083 211/183 |
| 2007/0187348 | A1 | * | 8/2007 | Malekmadani | A47B 87/0223 211/186 |
| 2010/0054906 | A1 | * | 3/2010 | Hartman | B65G 1/02 414/807 |
| 2011/0278251 | A1 | * | 11/2011 | Smith | B65G 1/02 211/183 |

FOREIGN PATENT DOCUMENTS

| | | | |
|---|---|---|---|
| JP | 09058809 | A | 3/1997 |
| JP | 09104513 | A | 4/1997 |
| JP | 09189142 | A | 7/1997 |
| JP | 11208830 | A | 8/1999 |
| JP | 2003118818 | A * | 4/2003 |
| JP | 2004210526 | A * | 7/2004 |
| JP | 2004244176 | A | 9/2004 |
| JP | 2008179473 | A | 8/2008 |
| JP | 4276290 | B1 * | 6/2009 |
| JP | 3170164 | U | 9/2011 |
| KR | 20150045899 | A * | 4/2015 |

OTHER PUBLICATIONS

International preliminary report on patentability dated Oct. 30, 2014 issued in corresponding PCT application No. PCT/JP2013/060662.

* cited by examiner

AUTOMATED WAREHOUSE RACK

CROSS REFERENCE TO RELATED APPLICATIONS

This application is a national stage of international application PCT/JP2013/060662, filed on Apr. 9, 2013, and claims the benefit of priority under 35 USC 119 of Japanese application 2012-095724, filed on Apr. 19, 2012, which are incorporated herein by reference.

TECHNICAL FIELD

The present invention relates to a rack, and more particularly relates to an automated warehouse rack that is disposed along a pathway of a stacker crane.

BACKGROUND ART

Automated warehouses are provided with a rack, which is disposed along a pathway of a stacker crane. The rack includes: a main body part, which includes a plurality of support posts arrayed along the pathway; and a plurality of shelf parts, which is provided to the main body part. The support posts include: a plurality of first support posts, which is arrayed adjacent the pathway; and a plurality of second support posts, which is arrayed spaced apart from the pathway. The first support posts and the second support posts have a one-to-one correspondence and thus form pairs; furthermore, the first support posts and the second support posts are disposed spaced apart from one another. Each shelf part receives an article. The shelf parts are provided, vertically spaced apart from one another, to the pairs of first support posts and second support posts. A stopper is provided on the pathway side of each shelf part in order to prevent the article from falling off the shelf part (e.g., refer to Patent Citation 1).

In a conventional rack, the stopper is attached to the pathway side of the shelf part by welding or screwing. Thereby, even if the rack shakes owing to the occurrence of an earthquake and the like, the article is stopped by the stopper and tends not to fall off of the shelf part.

CITATION LIST

Patent Literature

Patent Citation 1: Japanese Unexamined Patent Application Publication No. H11-208830

DISCLOSURE OF INVENTION

Technical Problem

In a conventional rack, if the rack shakes owing to the occurrence of an earthquake and the like, while the article may be stopped by the stopper, the shock is not absorbed, and therefore a cardboard box on a pallet, stacked articles, and the like may fall off of the shelf part.

An object of the present invention is to prevent, in a rack of an automated warehouse, an article from falling off of the rack in the case wherein the rack shakes.

Technical Solution

The following explains aspects of the present invention as means for solving the aforementioned problem. These aspects can be arbitrarily combined as needed.

According to one aspect of the present invention, an automatic storage rack is disposed along a pathway for a stacker crane. The rack includes a rack main body; and a plurality of shelves provided in the rack main body.

At least one of the shelves includes a hollow placement member and a stopper.

The placement member is fixed to the rack main body. The placement member extends in a first horizontal direction crossing the pathway and has an opening at an end thereof. The placement member has a placement surface onto which an article is placed.

The stopper is disposed at the end of the placement member. The stopper is configured to restrict vibration of the article in the first horizontal direction. The stopper includes a base member, a projection member, and a viscoelastic member. The base member fixed to the placement member such that the base member cannot move relative to the placement member in the first horizontal direction. The projection member has a projection extending higher than the placement surface. The viscoelastic member connects the base member and the projection member within the placement member. The viscoelastic member is configured to generate a damping force when the viscoelastic member is deformed by the shear in the first horizontal direction.

In this rack, the stopper, which has the viscoelastic member, can prevent the shaking of the article in the first horizontal direction.

In particular, the viscoelastic member generates the damping force by undergoing shear deformation in the first horizontal direction, and therefore can effectively dampen the shaking of the article in the first horizontal direction.

In addition, because the viscoelastic member connects the base member and the projection member inside the placement member, the amount by which the stopper protrudes from the end part of the placement member in the first horizontal direction becomes small.

The base member may include an elongated plate-like first portion extending in the first horizontal direction within the placement member. The viscoelastic member has an elongated portion extending along the first portion and fixed to the first portion.

The base member may further include a second portion extending from an end of the first portion disposed within the placement member in the opposite direction of the viscoelastic member, and a third member extending from an end of the first portion disposed out of the placement member in the opposite direction of the viscoelastic member.

Thereby, movement of the base member on the side opposite the viscoelastic member inside the placement member is limited.

The base member may further include a fourth portion extending from a tip of the third portion in the first horizontal direction and in contact with an inner surface of the placement member.

Thereby, the attitude of the base member is stabilized inside the placement member.

The projection member may include an elongated plate-like fixed portion extending in the first horizontal direction within the placement member, and the projection member being bent at and extending from the fixed portion.

At least one shelf may further include a thread member extending in the first horizontal direction within the placement member. The thread member is configured to fix the stopper to the end of the placement member, and each of the second portion and the third portion of the base member is formed with a hole through which the thread member penetrates.

The base member may further include a fifth portion that is fixed at the third portion and can get into contact with an end surface of the end of the placement member.

Thereby, movement of the base member inside of the placement member is limited.

The base member may be less rigid than the projection member. Thereby, it is possible to ensure the strength of the projection member and to make the base member lightweight.

Advantageous Effects

In the automated warehouse rack according to the present invention, the use of the stopper, which has the viscoelastic member, can suppress the shaking of the article in the first horizontal direction. As a result, in the case wherein the automated warehouse rack shakes, the article is prevented from falling off of the rack and breaking.

DESCRIPTION OF THE EMBODIMENTS (1) General Overview of Automated Warehouse

Figure 1:
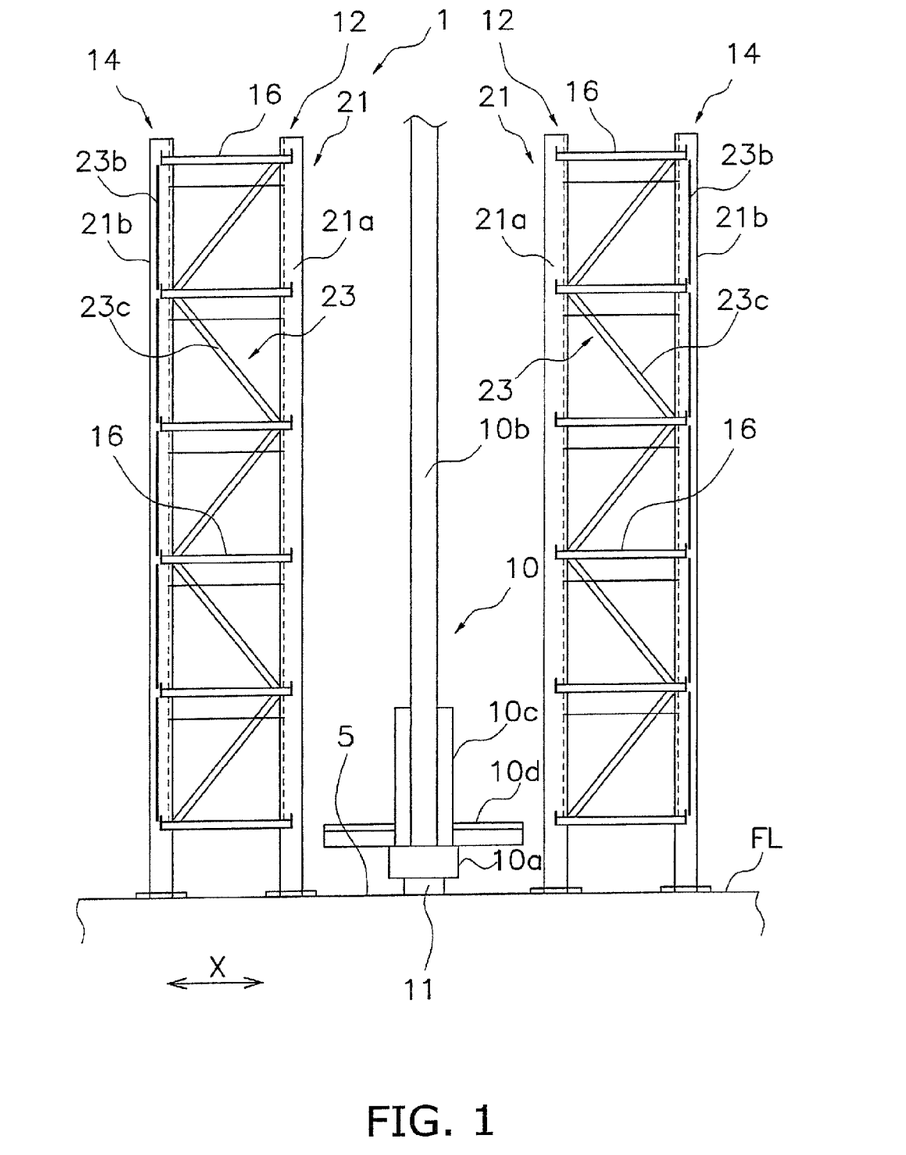
FIG. 1 is a schematic side view of an automated warehouse wherein one embodiment of the present invention is adopted.
Figure 2:
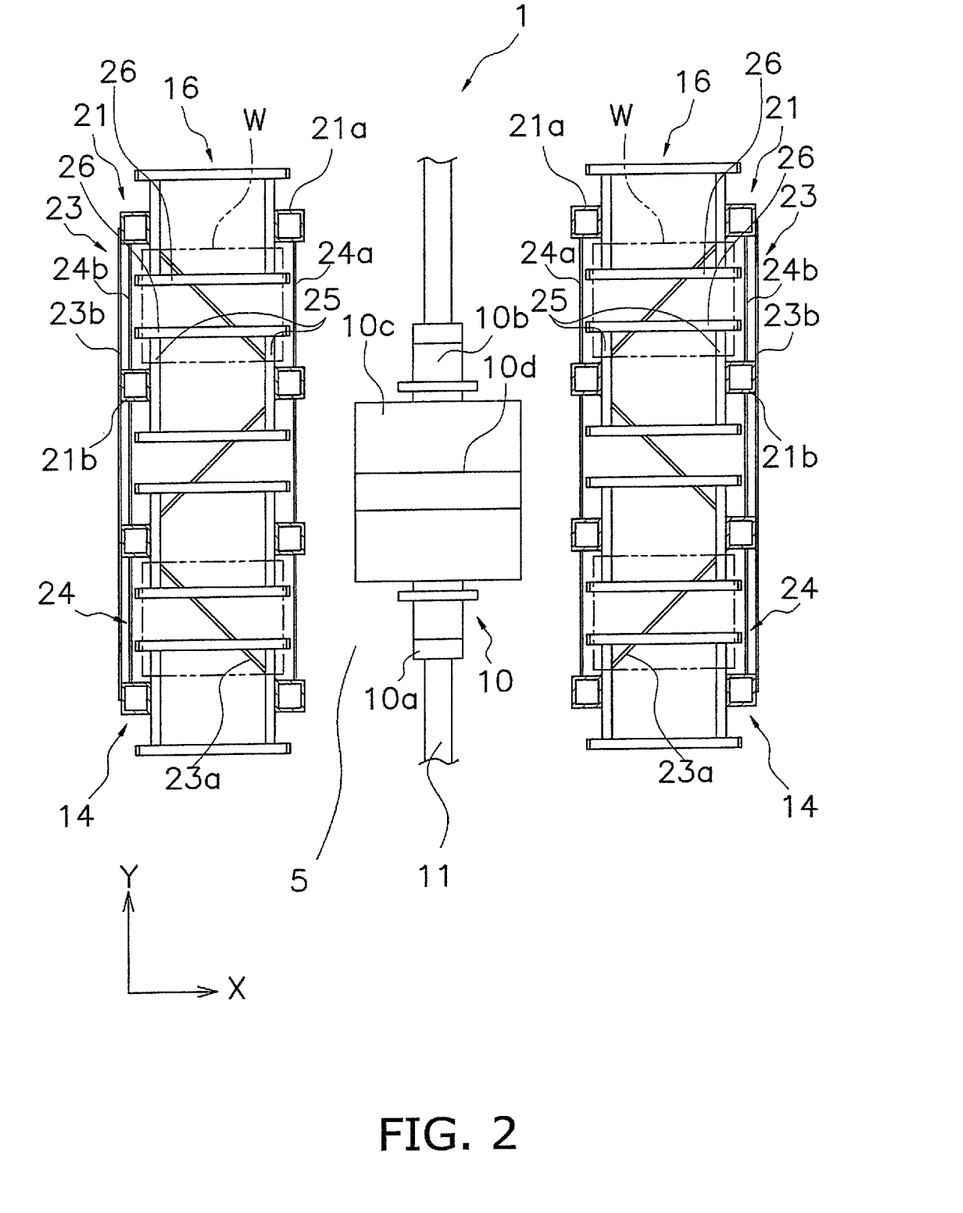
FIG. 2 is a schematic plan view of the automated warehouse.

FIG. 1 is a side view of an automated warehouse 1, viewed in the pathway direction of a stacker crane 10. FIG. 2 is a plan view of the automated warehouse 1, viewed from above.

Furthermore, a travel direction, which is the direction of a pathway 5 of the stacker crane 10, corresponds to the up-down direction in FIG. 2. In addition, a front-rear direction, which is orthogonal to the pathway 5 of the stacker crane 10, corresponds to the left-right direction in FIG. 1. In the explanation below, the latter is called the first horizontal direction X and the former is called the second horizontal direction Y.

The automated warehouse 1 principally includes the stacker crane 10 and rack apparatuses 12. The stacker crane 10 travels along the pathway 5 inside the automated warehouse 1. The stacker crane 10 conveys articles W and loads the articles W onto the rack apparatuses 12. The rack apparatuses 12 are disposed on both sides of the stacker crane 10. The stacker crane 10 includes: a travelling truck 10a; a mast 10b, which is erectly provided to the travelling truck 10a; an elevator platform 10c, which is raisably and lowerably supported by the mast 10b; and a transfer fork 10d, which advances toward and withdraws from the elevator platform 10c. The travelling truck 10a is guided by a pair of guide rails 11, which is vertically disposed along the pathway 5.

(2) Rack Apparatus

The rack apparatuses 12 according to one embodiment of the present invention are for storing the articles W. Each of the rack apparatuses 12 includes a rack apparatus main body 14 and a plurality of shelf parts 16, which is provided to the rack apparatus main body 14.

(2-1) Rack Apparatus Main Body

The rack apparatus main body 14 includes a plurality of support posts 21, a plurality of braces 23, and a plurality of horizontal members 24. The plurality of support posts 21 is disposed on a floor surface FL. Here, the support posts 21 disposed on the side close to the stacker crane 10 are called first support posts 21a. In addition, the support posts 21 disposed on the side spaced apart from the stacker crane 10 are called second support posts 21b. The first support posts 21a are disposed such that they are arrayed in the pathway direction. In addition, the second support posts 21b are disposed such that they are arrayed in the direction of the pathway 5. Furthermore, the first support posts 21a and the second support posts 21b are disposed and arrayed such that they have a one-to-one correspondence along the first horizontal direction X.

The braces 23 include horizontal braces 23a, back surface braces 23b, and side surface braces 23c. The horizontal braces 23a are disposed in a zigzag shape and couple the first support posts 21a and the second support posts 21b in the horizontal direction. The back surface braces 23b couple adjacent second support posts 21b in the vertical direction. The side surface braces 23c are disposed in a zigzag shape and couple the first support posts 21a and the second support posts 21b in the vertical direction. The horizontal members 24 include first horizontal members 24a, which couple with the first support posts 21a in the horizontal direction, and second horizontal members 24b, which couple with the second support posts 21b. The horizontal members 24 are provided, vertically spaced apart, to each shelf part 16 of the plurality of shelf parts 16.

(2-2) Shelf Part

The shelf parts 16 are the portions whereon the articles W are loaded. The shelf parts 16 are provided between the first support posts 21a and the second support posts 21b. Here, the plurality of shelf parts 16 is mounted to the first support posts 21a and the second support posts 21b such that the shelf parts 16 are spaced apart from one another in height direction.

Figure 6:
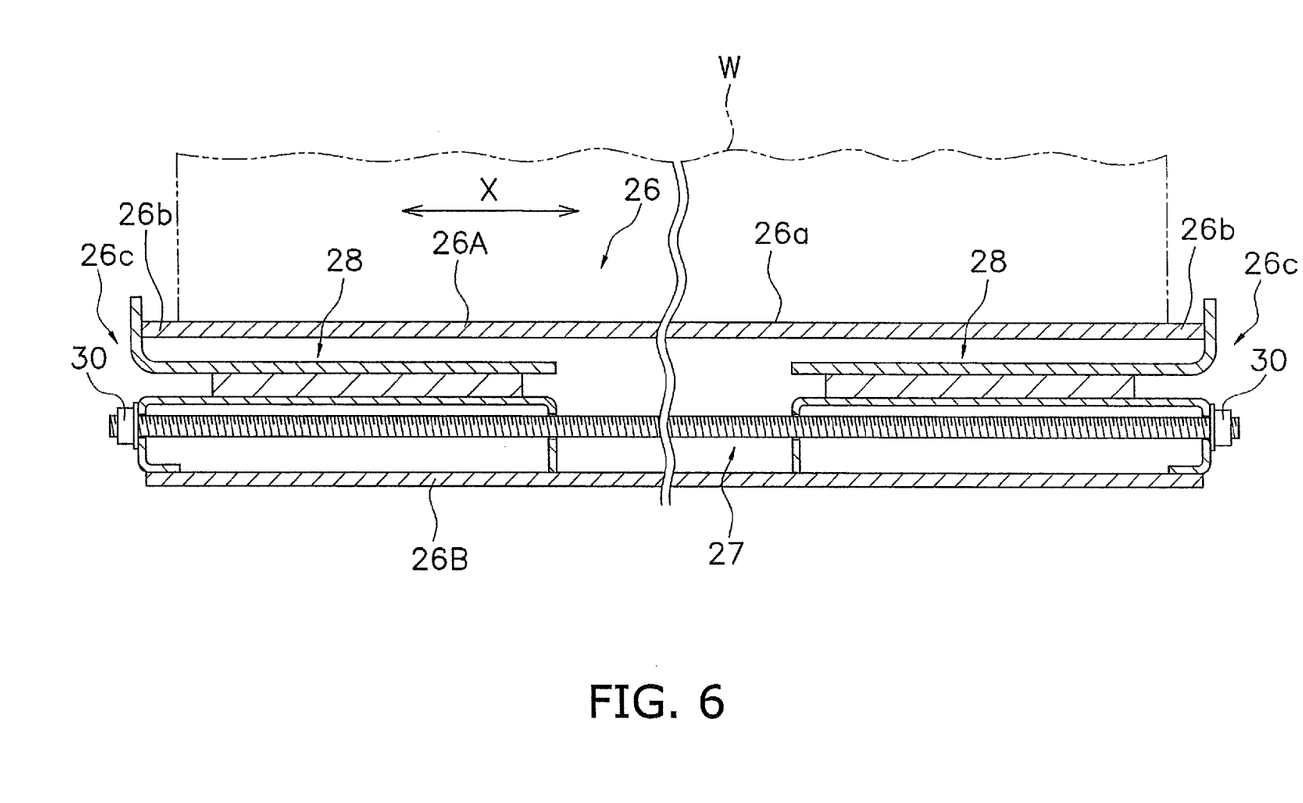
FIG. 6 is a cross sectional view of a placement member.
Figure 7:
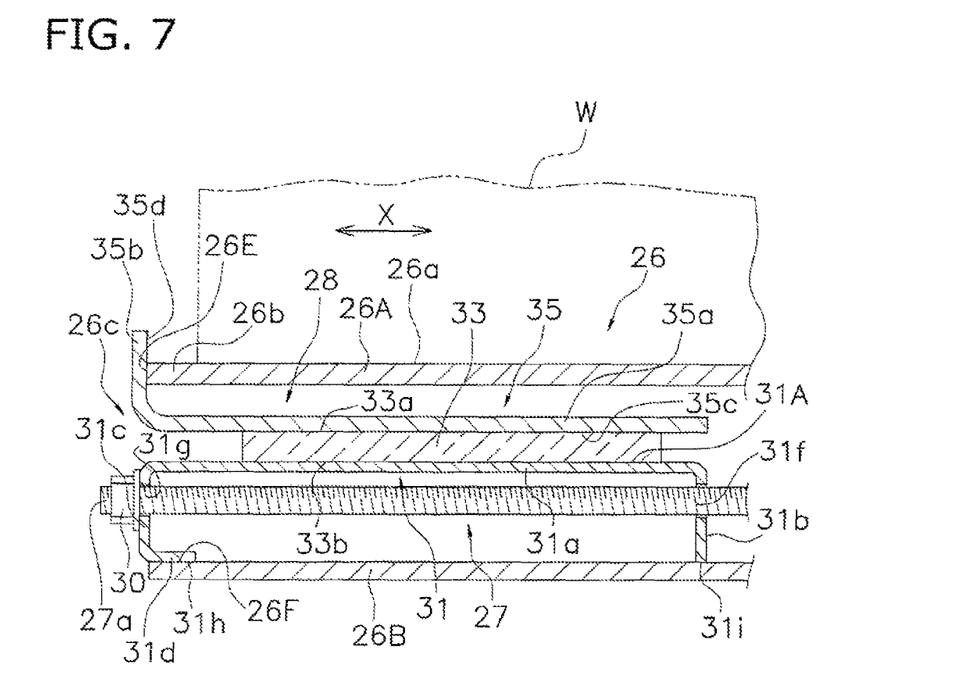
FIG. 7 is a cross sectional view of a stopper.

As shown in FIG. 2, FIG. 3, FIG. 4, and FIG. 5, each of the shelf parts 16 includes: a pair of support members 25, which is fixed to the support posts 21; and placement members 26 (i.e., one example of placement members), which is supported by the support members 25 by cantilevering. In addition, as shown in FIG. 6 and FIG. 7, the shelf part 16 includes: a screw member 27, stoppers 28, and nuts 30.

Figure 3:
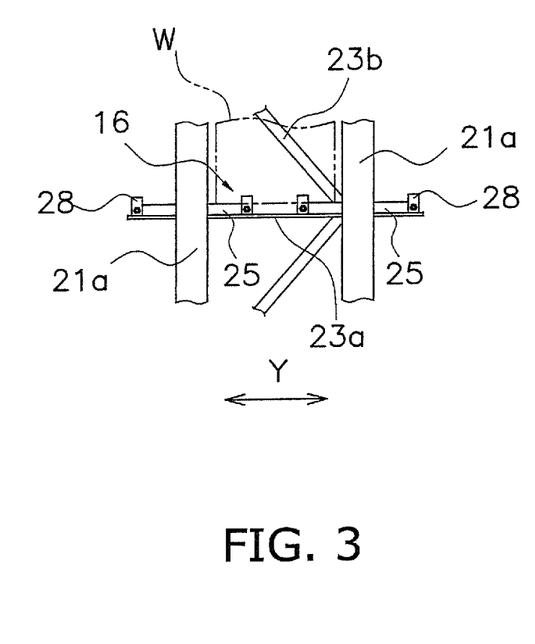
FIG. 3 is a front view of a shelf part.
Figure 4:
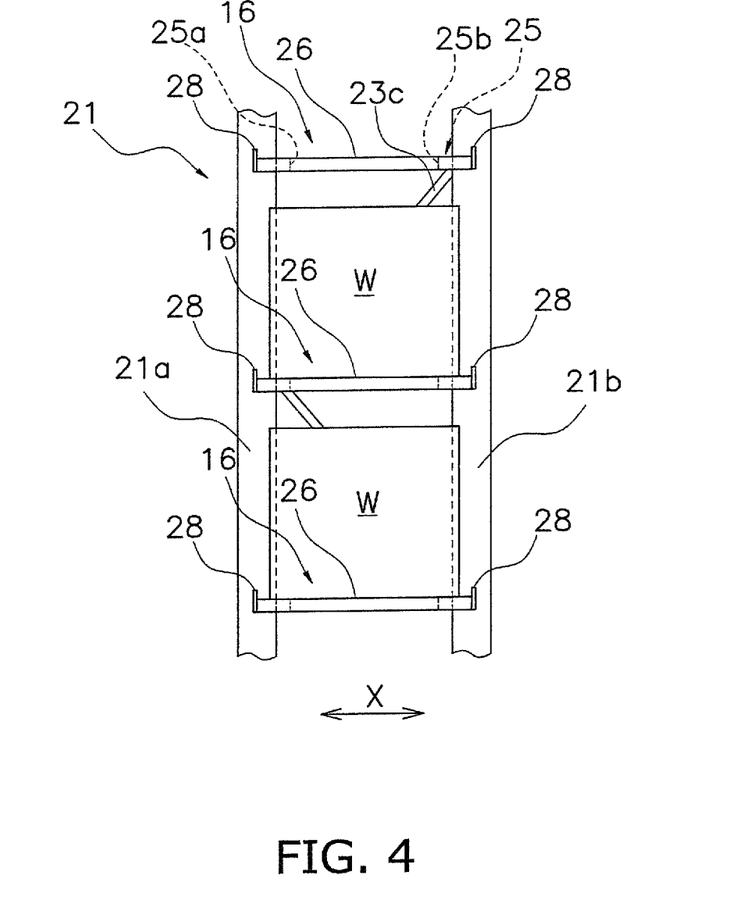
FIG. 4 is a side view of the shelf part.
Figure 5:
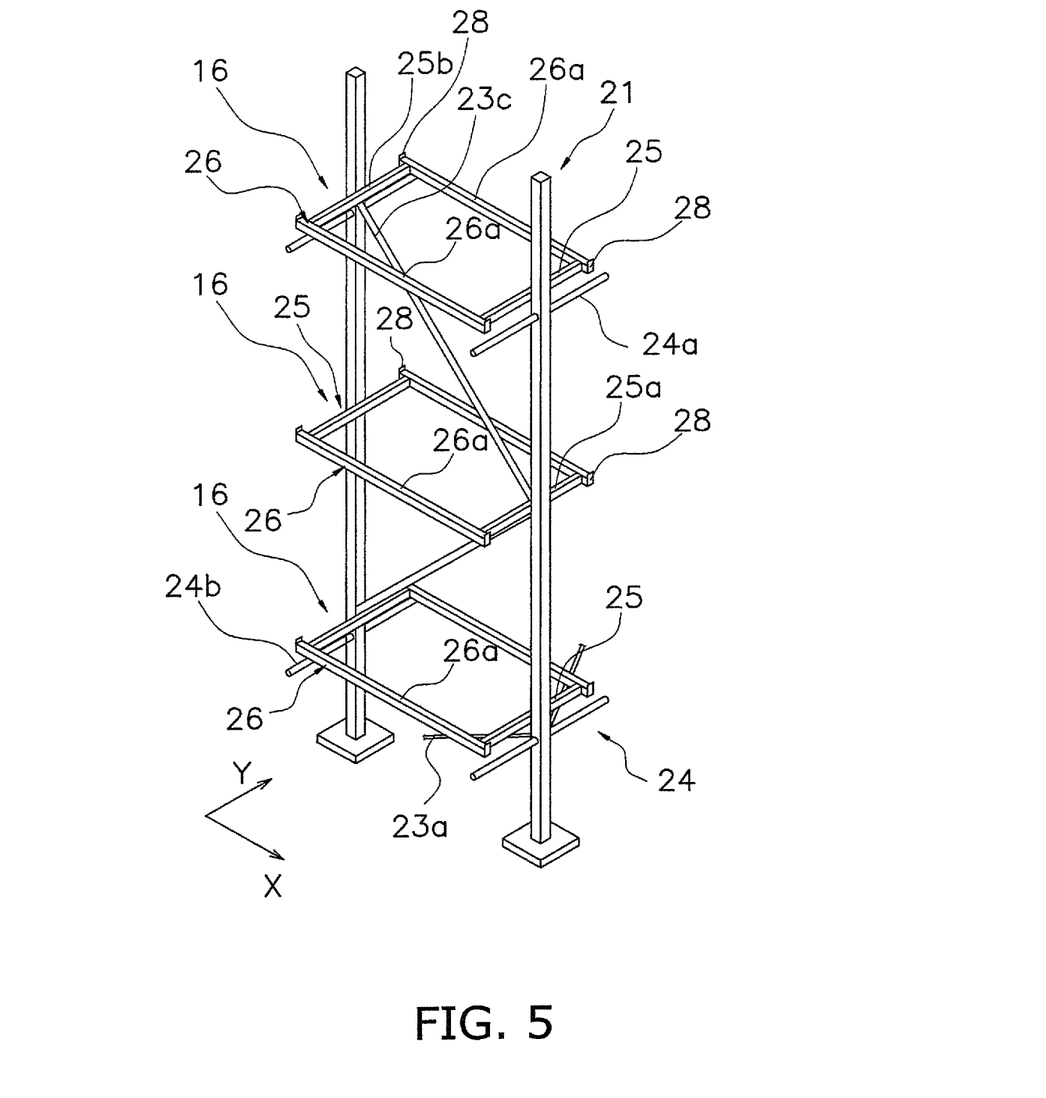
FIG. 5 is an oblique view of the shelf part.

As shown in FIG. 3, FIG. 4, and FIG. 5, the pairs of support members 25 are members that support the placement members 26. Each support member 25 of the pairs of support members 25 is a member that is long in the second direction Y. Here, each pair of the support members 25 is fixed to the first support posts 21a and the second support posts 21b such that the support members 25 are parallel to one another. Specifically, one support member 25 (i.e., a first support member 25a) of each pair of the support members 25 is fixed to one of the first support posts 21a, and the other support member 25 (i.e., a second support member 25b) of each pair of the support members 25 is fixed to one of the second support posts 21b.

As shown in FIG. 6, FIG. 7, FIG. 8, and FIG. 9, the placement member 26 is a hollow member that is fixed to the rack main body part. The placement member 26 has an elongated shape and extends in the first horizontal direction X. The placement member 26 is fixed to tip parts of the pair of support members 25. Specifically, the placement member 26 spans the space between the tip part of the first support member 25a and the tip part of the second support member 25b and is fixed to both tip parts.

More specifically, the placement member 26 is made of hollow square pipes. The placement member 26 includes an upper part 26A, a lower part 26B, a first side part 26C, and a second side part 26D. The placement member 26 extends in the first horizontal direction X. The placement member 26 has openings 26c in end parts 26b. Each of the openings 26c opens in the first horizontal direction X.

An upper surface of the placement member 26 is a placement surface 26a, whereon the article W is placed.

(3) Stopper

The stoppers 28 are provided to the end parts 26b of the placement member 26 and are members for damping vibration of the article W in the first horizontal direction X. Each stopper 28 includes a base member 31, a projection member 35, and a viscoelastic member 33. The base member 31 and the projection member 35 are each made of, for example, a steel plate. Furthermore, in the present embodiment, as shown in FIG. 6, the stoppers 28 are provided to both of the end parts 26b of the placement member 26.

The base member 31 is fixed (the fixing method is discussed below) to the placement member 26 such that it is immovable in the first horizontal direction X. The projection member 35 includes a protruding part 35b, which extends upward from the placement surface 26a. The viscoelastic member 33 connects, inside the placement member 26, the base member 31 and the projection member 35, and can generate a damping force by shear deformation in the first horizontal direction X.

Below, the structure of the stopper 28 is explained in detail.
(3-1) Base Member The base member 31 includes an elongated thin plate shaped first portion 31a, which extends in the first horizontal direction X inside the placement member 26. The first portion 31a has a rectangular shape and its principal plane faces the up-down direction. The length of the first portion 31a in the first horizontal direction X is greater than the length of the first portion 31a in the second horizontal direction Y. The first portion 31a has an upper surface 31A, which is fixed to a lower surface 33b of the viscoelastic member 33.

The base member 31 includes: a second portion 31b, which extends downward from an inner side end part of the first portion 31a (i.e., from a portion toward the inner side of the placement member 26); and a third portion 31c, which extends downward from an outer side end part of the first portion 31a (i.e., from a portion in the vicinity of the opening 26c of the placement member 26). The second portion 31b and the third portion 31c are each bent at an angle of 90° from the first portion 31a.

Providing the second portion 31b and the third portion 31c limits the movement of the base member 31 on the side opposite the viscoelastic member 33 inside the placement member 26.

The base member 31 includes a fourth portion 31d, which extends from a lower end of the third portion 31c in the first horizontal direction. The fourth portion 31d is folded from the lower end of the third portion 31c and extends on the inner side of the placement member 26. A lower end surface 31h of the fourth portion 31d and a lower end surface 31i of the second portion 31b make contact with an inner side surface 26F of the lower part 26B of the placement member 26. The fourth portion 31d stabilizes the attitude of the base member 31 inside the placement member 26.

The base member 31 includes fifth portions 31e, which are provided to the third portion 31c. The fifth portions 31e extend in the second horizontal direction Y from both sides of the third portion 31c in the second horizontal direction Y. In the drawing, the fifth portions 31e make contact with end surfaces 26G of the first side part 26C and the second side part 26D of the placement member 26. The fifth portions 31e limit the movement of the base member 31 to the inner side of the placement member 26.

As discussed above, the base member 31 is disposed inside the placement member 26. The length of the first portion 31a of the base member 31 in the second horizontal direction Y is substantially the same as or slightly shorter than the length of the internal space of the placement member 26 in the second horizontal direction Y.

(3-2) Projection Member

The projection member 35 includes a fixed part 35a and the protruding part 35b. The fixed part 35a has an elongated thin plate shape that extends in the first horizontal direction X inside the placement member 26. The fixed part 35a is fixed to the viscoelastic member 33. Specifically, the fixed part 35a corresponds to the first portion 31a of the base member 31 and is disposed thereabove; furthermore, the fixed part 35a has a lower surface 35c, which is fixed to an upper surface 33a of the viscoelastic member 33.

At the end part 26b of the placement member 26, the protruding part 35b is disposed such that it protrudes upward from the placement surface 26a. The protruding part 35b is folded at an angle of 90° from the outer side end part of the fixed part 35a (i.e., in the vicinity of the end part 26b) and extends upward. A first surface 35d of the protruding part 35b faces the first horizontal direction X, and, in FIG. 7, makes contact with or is proximate to an end surface 26E of the upper part 26A of the placement member 26.

As discussed above, the projection member 35 is a member that is disposed inside the placement member 26. The length of the fixed part 35a of the projection member 35 in the second horizontal direction Y is substantially the same as or slightly shorter than the length of the internal space of the placement member 26 in the second horizontal direction Y.

Furthermore, the projection member 35 is stiffer than the base member 31. As shown in FIG. 7, the plate thickness of the projection member 35 is greater than that of the base member 31. Namely, the stiffness of the base member 31 is lower than that of the projection member 35 and thereby the base member 31 can be made lighter.

(3-3) Viscoelastic Member

Figure 8:
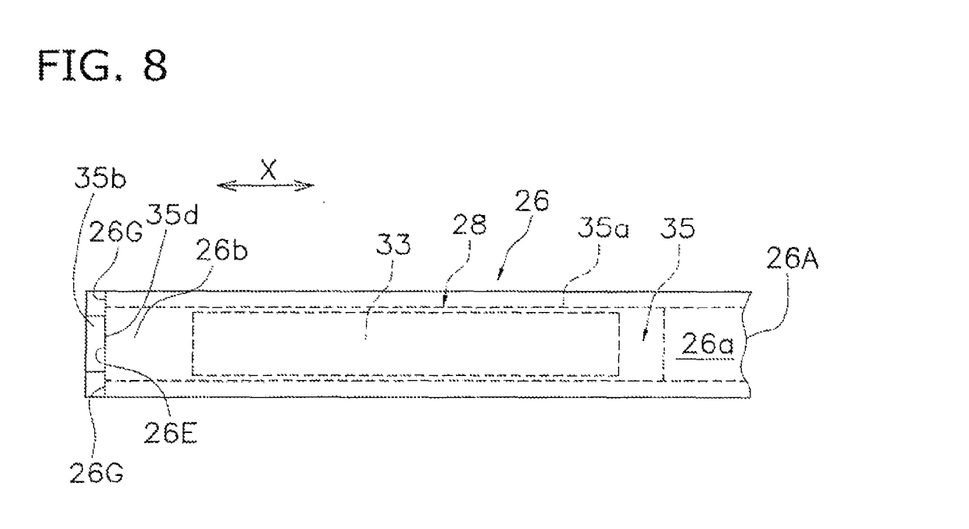
FIG. 8 is a plan view of the stopper.
Figure 9:
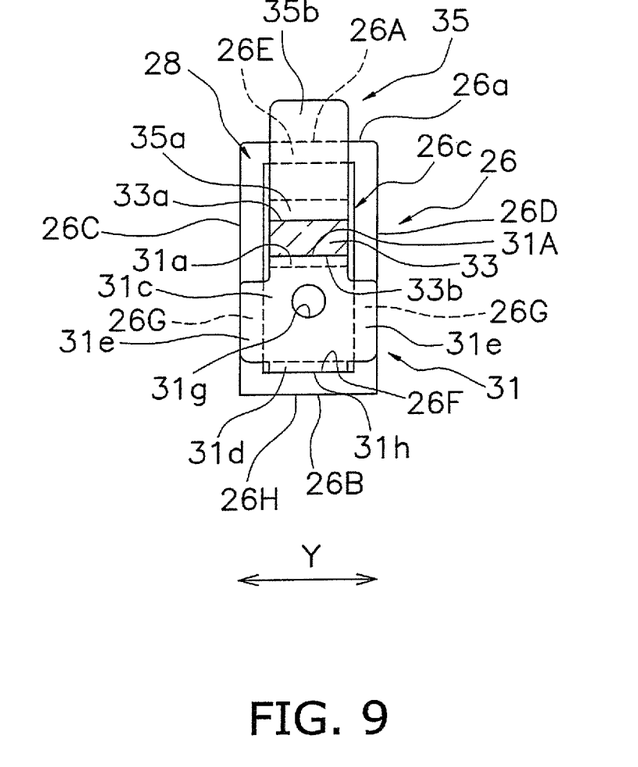
FIG. 9 is a side view of the stopper.

As is clear from FIG. 8, the viscoelastic member 33 has an elongated plate shape that extends along the first portion 31a. In greater detail, the viscoelastic member 33 has an elongated rectangular shape that, in a plan view, corresponds to the shape of the first portion 31a of the base member 31 and the fixed part 35a of the projection member 35. The material properties, the shape, and the position of the viscoelastic member 33 are prescribed so as to implement a damping performance sufficient to handle the anticipated shaking.

The viscoelastic member 33 is interposed between and fixed to the first portion 31a of the base member 31 and the fixed part 35a of the projection member 35 and is capable of shear deformation if a force acts upon the projection member 35 in the first horizontal direction X. Specifically, the upper surface 33a of the viscoelastic member 33 is fixed to the lower surface 35c of the fixed part 35a of the projection member 35. The lower surface 33b of the viscoelastic member 33 is fixed to the upper surface 31A of the first portion 31a of the base member 31. In so doing, the viscoelastic member 33 couples the base member 31 and the projection member 35. The method by which the viscoelastic member 33 is fixed is, for example, thermocompression bonding, bonding, or affixing with double sided tape.

The viscoelastic member 33 is, for example, a viscoelastic rubber that has high damping performance. The viscoelastic rubber has both a low spring constant for the vibration isolating function (i.e., performance that isolates vibration) and a high damping coefficient for the vibration damping function (i.e., performance that absorbs vibration). By undergoing shear deformation, the viscoelastic rubber can convert vibrational energy, which occurs owing to the collision of the article W with the stopper 28, into thermal energy.

(3-4) Screw Member

The screw member 27 is a member for fixing the stopper 28 to the end part 26b of the placement member 26. The screw member 27 extends in the first horizontal direction X inside the placement member 26. The screw member 27 is a member that is longer than the placement member 26 in the first horizontal direction X. Male thread parts 27a are formed at at least both end parts of an outer circumferential surface of the screw member 27. Through holes 31f, 31g, wherethrough the screw member 27 passes, are formed in the second portion 31b of the base member 31 and in the third portion 31c of the base member 31.

At both ends of the screw member 27, the nuts 30 screw onto the male thread parts 27a on the outer sides of the third portions 31c of the base member 31. Tightening the nuts 30 presses the stoppers 28 toward the placement member 26, and thereby the stoppers 28 are fixed to the end parts 26b of the placement member 26.

(3-5) State Wherein the Stoppers are Fixed

In this state, the base member 31 is disposed inside the placement member 26 and is immovably fixed to the placement member 26. Specifically, the base member 31 is urged toward the inner side of the placement member 26, and the fifth portion 31e is pressed against the end surface 26G. Accordingly, the base member 31 is immovable with respect to the placement member 26 in the first horizontal direction X. Furthermore, because the base member 31 includes the portions (31b, 31d) that make contact with the inner side surface 26F of the placement member 26, the movement of the base member 31 inside the placement member 26 is limited.

In addition, the projection member 35 is disposed inside the placement member 26 and is capable of moving within a prescribed range with respect to the placement member 26. Specifically, the projection member 35 is supported by the base member 31 via the viscoelastic member 33 such that it is capable of moving in the first horizontal direction X. In the state shown in FIG. 7, the protruding part 35b makes contact with or is proximate to the end part 26b, and therefore the amount by which the projection member 35 can move further toward the inner side (i.e., the right side in FIG. 7) of the placement member 26 is small or zero. Moreover, the projection member 35 can move toward the outer side (i.e., the left side in FIG. 7) of the placement member 26 (i.e., can move in a direction away from the end part 26b) in the range permitted by the viscoelastic member 33.

For example, if the article W collides with the protruding part 35b of the projection member 35 owing to shaking caused by an earthquake, then the projection member 35 moves toward the outer side of the placement member 26. At this time, the upper surface of the viscoelastic member 33 is pulled toward the outer side (i.e., the left side in FIG. 7) by the projection member 35, and the lower surface of the viscoelastic member 33 is pulled toward the inner side (i.e., the right side in FIG. 7) by the base member 31. As a result, the viscoelastic member 33 undergoes shear deformation.

(4) Operation when an Earthquake Occurs

In the rack apparatus 12 configured in this manner, if the floor surface FL shakes owing to an earthquake and the like and that shaking is transmitted to the shelf part 16 via the rack apparatus main body 14, then the article W attempts to move. However, because the stopper 28, which protrudes upward from the placement surface 26a, is provided to the placement member 26, the article W, which is placed on the placement member 26, makes contact with the stopper 28, and thereby the article W tends not to fall down. In particular, because there is the back surface brace 23b on the far side (i.e., rear side) of the shelf part 16, the article W tends not to fall down on the far side; however, on the front side, there is nothing to hinder the movement of the article W, and, consequently, if the stopper 28 is absent, there is a risk that the article W will fall down on the pathway 5 side. However, the movement of the article W toward the pathway 5 side can be deterred by the stopper 28.

Specifically, if an earthquake occurs, the article W moves any number of times in the first horizontal direction X and repetitively collides with the stopper 28 on both sides. With every collision, the viscoelastic member 33 deforms and subsequently attempts to return to its original shape. Thus, every time the article W collides with the stopper 28, that kinetic energy is converted to thermal energy, and thereby the shaking of the article W is damped.

(5) Operational Effects of the Embodiment

The embodiment can be expressed as below.

The rack apparatuses 12 (i.e., one example of the rack) for the automated warehouse 1 (i.e., one example of an automated warehouse) is disposed along the pathway 5 (i.e., one example of a pathway) for the stacker crane 10 (i.e., one example of a stacker crane). Each rack apparatus 12 includes the rack apparatus main body 14 (i.e., one example of a rack main body) and the plurality of shelf parts 16 (i.e., one example of shelf parts), which is provided to the rack apparatus main body 14.

At least one of the shelf parts 16 includes the placement member 26 (i.e., one example of a hollow placement member) and the stopper 28 (i.e., one example of a stopper).

The placement member 26 is fixed to the apparatus main body 14. The placement member 26 extends in the first horizontal direction X orthogonal to the pathway 5 and has an opening at an end 26b thereof. The placement member 26 has a placement surface 26a onto which the article W is placed.

The stopper 28 is a member that is disposed at the end part 26b of the placement member 26 and can receive the load of the article W. The stopper 28 includes the base member 31, the projection member 35, and the viscoelastic member 33. The base member 31 is fixed to the placement member 26 such that the base member 31 cannot move relative to the placement member 26 in the first horizontal direction X. The projection member 35 has a projection 35b extending higher than the placement surface 26a. The viscoelastic member 33 connects the base member 31 and the projection member 35 within the placement member 26. The viscoelastic member 33 is configured to generate a damping force when the viscoelastic member 33 is deformed by the shear in the first horizontal direction X.

In the rack apparatus 12, the viscoelastic member 33 can restrict the article W from falling down when the article W collides with the stoppers 28.

In particular, the viscoelastic member 33 generates a damping force by undergoing shear deformation in the first horizontal direction X, and therefore can effectively damp the shaking of the article W in the first horizontal direction X.

In addition, the viscoelastic member 33 connects the base member 31 and the projection member 35 inside the placement member 26, and therefore the amount by which the stoppers 28 protrude from the end parts 26b of the placement member 26 in the first horizontal direction X becomes small.

(6) Other Embodiments

The above text explained one embodiment of the present invention, but the present invention is not limited to the above embodiment, and it is understood that variations and modifications may be effected without departing from the spirit and scope of the invention. In particular, a plurality of the embodiments and modified examples written in the present specification can be arbitrarily combined as needed.

(a) In the embodiment, the base member 31 is fixed to the placement member 26 by the screw member 27, but the means by which the base member is fixed to the placement member is not limited to the screw member.

Figure 10:
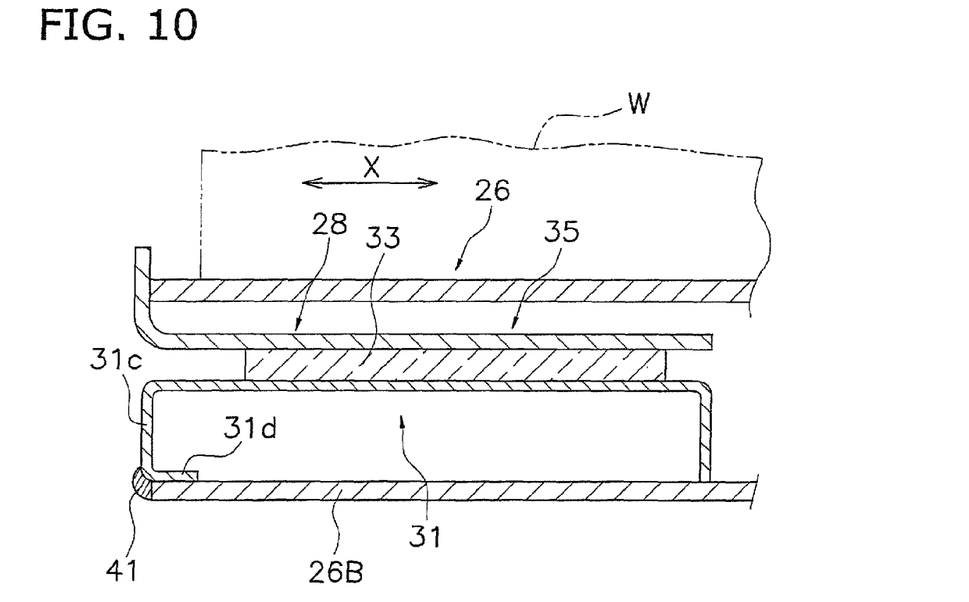
FIG. 10 is a cross sectional view of the stopper according to another embodiment.
Figure 11:
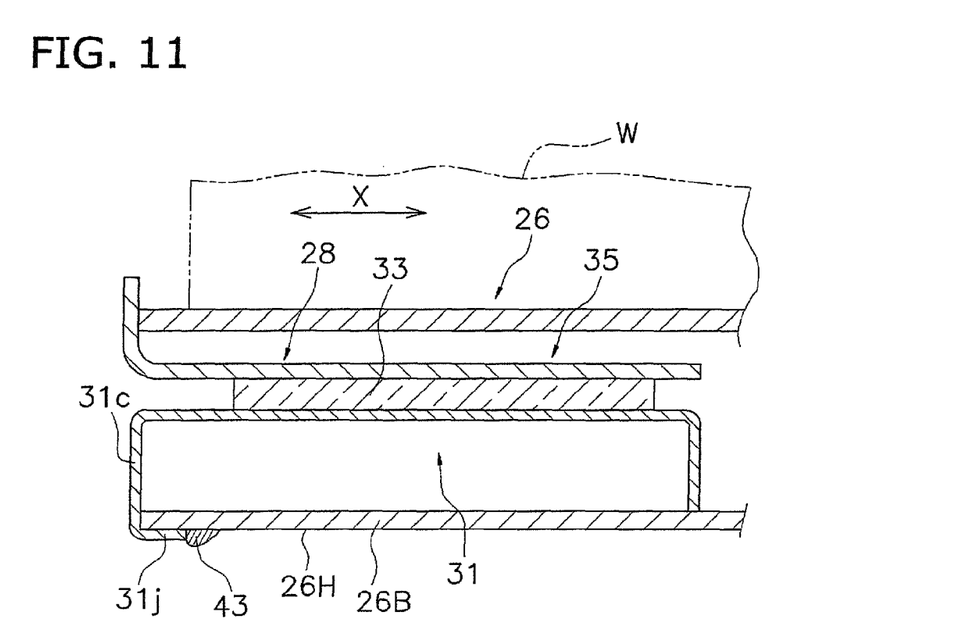
FIG. 11 is a cross sectional view of the stopper according to another embodiment.

FIG. 10 and FIG. 11 show a means of fixing by welding.

In FIG. 10, a boundary part between the third portion 31c and the fourth portion 31d is fixed by a welding part 41.

In FIG. 11, a fourth portion 31j, which extends from the lower end of the third portion 31c, is caused to make contact with an outer side surface 26H of the lower part 26B and is fixed by a welding part 43.

Figure 12:
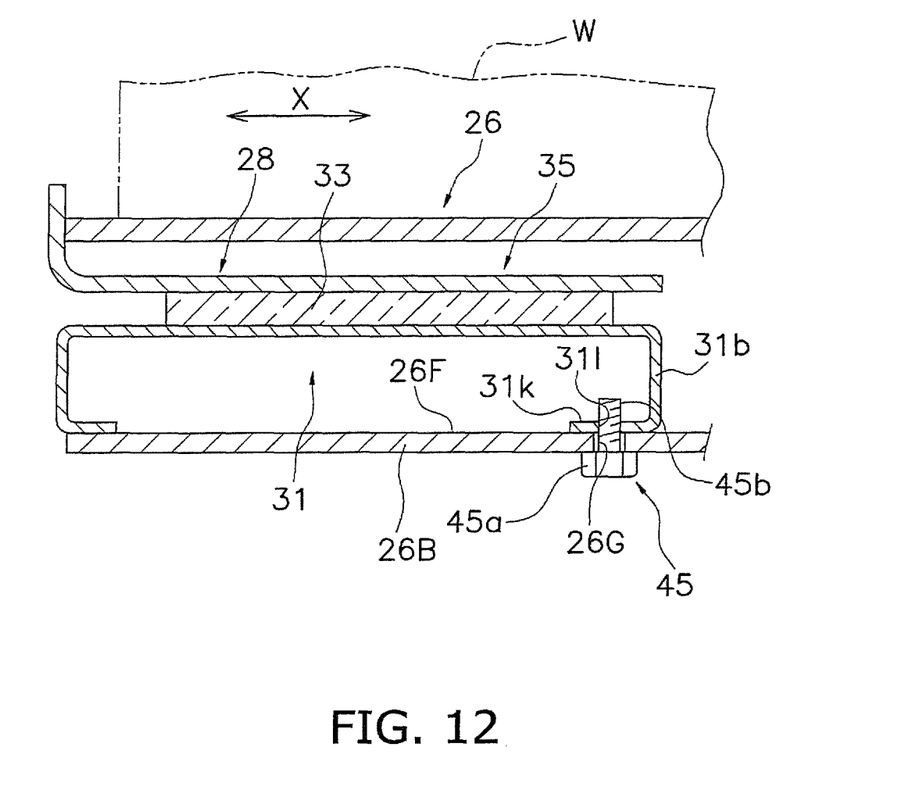
FIG. 12 is a cross sectional view of the stopper according to another embodiment.

FIG. 12 shows a means of fixing by a bolt. In FIG. 12, a sixth portion 31k, which is folded from the lower end of the second portion 31b, is caused to make contact with the inner side surface 26F of the lower part 26B. A bolt hole 311 (i.e., a female thread) is formed in the sixth portion 31k. A head part 45a of a bolt 45 makes contact with the outer side surface 26H of the lower part 26B, and a screw part 45b of the bolt 45 passes through a through hole 26G formed in the lower part 26B and screws into the bolt hole 311.

(b) In the abovementioned embodiment, the placement member includes a square pipe, but the present invention is not limited thereto. The placement member may have any shape as long as it is a hollow shape, and therefore may be quadrangular, polygonal, round, or some other shape.

(c) The stopper is advantageous in that it is easy to adapt to an existing rack apparatus. Furthermore, the stopper can also be adapted to a new rack apparatus.

(d) In the abovementioned embodiment, the stoppers are provided to both ends of the placement member, but the stopper may be provided to only one end part of the placement member.

(e) In the abovementioned embodiment, the principal plane of the first portion of the base member, the principal plane of the viscoelastic member, and the principal plane of the fixed part of the projection member all face the up-down direction, but the principal planes of these members may face some other direction. For example, the principal plane of the first portion of the base member, the principal plane of the viscoelastic member, and the principal plane of the fixed part of the projection member may face the horizontal direction.

(f) In the abovementioned embodiment, the viscoelastic member corresponds to the entire principal plane of the first portion of the base member and the entire principal plane of the fixed part of the projection member, but the viscoelastic member may only partially correspond to these members.

(g) In the abovementioned embodiment, there is one viscoelastic member per stopper, but a plurality of viscoelastic bodies may be used for each stopper.

INDUSTRIAL APPLICABILITY

The present invention can be widely adapted to a rack apparatus of an automated warehouse.

EXPLANATION OF REFERENCE SYMBOLS

1 Automated warehouse
5 Pathway
10 Stacker crane
10a Travelling truck
10b Mast
10c Elevator platform
10d Fork
11 Guide rail
12 Rack apparatus
14 Rack apparatus main body
16 Shelf part
21 Support post
21a First support post
21b Second support post
23 Brace
23a Horizontal brace
23b Back surface brace
23c Side surface brace
24 Horizontal member
24a First horizontal member
24b Second horizontal member
25 Support member
25a First support member
25b Second support member
26 Placement member
26A Upper part
26B Lower part
26C First side part
26D Second side part
26E End surface
26F Inner side surface
26G End surface
26H Outer side surface
26a Placement surface
26b End part
26c Opening
27 Screw member
27a Male thread part
28 Stopper
30 Nut
31 Base member
31A Upper surface
31a First portion
31b Second portion
31c Third portion
31d Fourth portion
31e Fifth portion
31f Through hole
31g Through hole
31h Lower end surface
31i Lower end surface
33 Viscoelastic member
35 Projection member
35a Fixed part 35b Protruding part
35c Lower surface
35d First surface

The invention claimed is:

1. An automatic storage rack disposed along a pathway for a stacker crane, comprising:
   a rack main body; and
   a plurality of shelves provided in the rack main body; wherein
   at least one of the shelves includes:
   a hollow placement member fixed to the rack main body, the placement member extending in a first horizontal direction crossing the pathway and having an opening at an end thereof, the placement member having a placement surface onto which an article is placed; and
   a stopper disposed at the end of the placement member, the stopper being configured to restrict vibration of the article in the first horizontal direction, the stopper including a base member fixed to the placement member such that the base member cannot move relative to the placement member in the first horizontal direction, and a projection member having a projection extending higher than the placement surface, and a viscoelastic member connecting the base member and the projection member within the placement member, the viscoelastic member being configured to generate a damping force when the viscoelastic member is deformed by the shear in the first horizontal direction.

2. The automatic storage rack according to claim 1, wherein the base member includes an elongated plate-like first portion extending in the first horizontal direction within the placement member, and
   the viscoelastic member has an elongated portion extending along the first portion and fixed to the first portion.

3. The automatic storage rack according to claim 2, wherein the base member further includes a second portion extending from an end of the first portion disposed within the placement member in the opposite direction of the viscoelastic member, and a third member extending from an end of the first portion disposed out of the placement member in the opposite direction of the viscoelastic member.

4. The automatic storage rack according to claim 3, wherein the base member further includes a fourth portion extending from a tip of the third portion in the first horizontal direction and in contact with an inner surface of the placement member.

5. The automatic storage rack according to claim 1, wherein the projection member includes an elongated plate-like fixed portion extending in the first horizontal direction within the placement member and the projection member being bent at and extending from the fixed portion.

6. The automatic storage rack according to claim 2, wherein the projection member includes an elongated plate-like fixed portion extending in the first horizontal direction within the placement member and the projection member being bent at and extending from the fixed portion.

7. The automatic storage rack according to claim 3, wherein the projection member includes an elongated plate-like fixed portion extending in the first horizontal direction within the placement member and the projection member being bent at and extending from the fixed portion.

8. The automatic storage rack according to claim 4, wherein the projection member includes an elongated plate-like fixed portion extending in the first horizontal direction within the placement member and the projection member being bent at and extending from the fixed portion.

9. The automatic storage rack according to claim 3, wherein the at least one shelf further includes a thread member extending in the first horizontal direction within the placement member, the thread member being configured to fix the stopper to the end of the placement member, and each of the second portion and the third portion of the base member is formed with a hole through which the thread member penetrates.

10. The automatic storage rack according to claim 4, wherein the at least one shelf further includes a thread member extending in the first horizontal direction within the placement member, the thread member being configured to fix the stopper to the end of the placement member, and each of the second portion and the third portion of the base member is formed with a hole through which the thread member penetrates.

11. The automatic storage rack according to claim 9, wherein the base member further includes a fifth portion that is fixed at the third portion and can get into contact with an end surface of the end of the placement member.

12. The automatic storage rack according to claim 10, wherein the base member further includes a fifth portion that is fixed at the third portion and can get into contact with an end surface of the end of the placement member.

13. The automatic storage rack according to claim 1, wherein the base member is less rigid than the projection member.

14. The automatic storage rack according to claim 2, wherein the base member is less rigid than the projection member.

15. The automatic storage rack according to claim 3, wherein the base member is less rigid than the projection member.

* * * * *